(12) United States Patent
Miyazaki et al.

(10) Patent No.: US 9,145,841 B2
(45) Date of Patent: Sep. 29, 2015

(54) LOW-PRESSURE EXHAUST GAS RECIRCULATION SYSTEM

(75) Inventors: Shinsuke Miyazaki, Chiryu (JP); Takaaki Oohashi, Ichinomiya (JP); Koji Hashimoto, Anjo (JP)

(73) Assignee: DENSO CORPORATION, Kariya (JP)

( * ) Notice: Subject to any disclaimer, the term of this patent is extended or adjusted under 35 U.S.C. 154(b) by 413 days.

(21) Appl. No.: 13/615,786

(22) Filed: Sep. 14, 2012

(65) Prior Publication Data

US 2013/0104859 A1 May 2, 2013

(30) Foreign Application Priority Data

Oct. 31, 2011 (JP) ................................ 2011-238989

(51) Int. Cl.
| | |
|---|---|
| F02M 25/07 | (2006.01) |
| F02D 41/00 | (2006.01) |
| F02D 41/04 | (2006.01) |
| F02D 9/02 | (2006.01) |

(52) U.S. Cl.
CPC ....... *F02D 41/0077* (2013.01); *F02M 25/0786* (2013.01); *F02D 41/042* (2013.01); *F02D 2009/0276* (2013.01); *F02M 25/0773* (2013.01); *Y02T 10/47* (2013.01)

(58) Field of Classification Search
CPC .......... F02M 25/0702; F02M 25/0771; F02M 25/0773; F02D 2009/0276; F02D 2009/0277; F02D 2009/0279; F02D 2009/0281
USPC .......................... 123/568.16–568.19, 568.21, 123/568.23–568.25, 196 S, 196 D; 701/108, 701/112, 114; 73/114.74
See application file for complete search history.

(56) References Cited

U.S. PATENT DOCUMENTS

| | | | | |
|---|---|---|---|---|
| 6,073,610 | A * | 6/2000 | Matsumoto et al. | 123/396 |
| 7,163,005 | B2 * | 1/2007 | Tussing et al. | 123/568.12 |
| 7,516,724 | B2 * | 4/2009 | Ohtsuji | 123/73 A |
| 8,065,992 | B2 * | 11/2011 | Tschaler et al. | 123/568.12 |
| 2002/0161496 | A1 * | 10/2002 | Yamaki | 701/33 |
| 2007/0107708 | A1 * | 5/2007 | Uchiyama et al. | 123/568.18 |
| 2007/0240676 | A1 * | 10/2007 | Sasaki | 123/337 |
| 2010/0000500 | A1 * | 1/2010 | Shimizu et al. | 123/568.21 |
| 2011/0023846 | A1 | 2/2011 | Miyazaki et al. | |
| 2012/0145134 | A1 * | 6/2012 | Miyazaki et al. | 123/568.2 |

* cited by examiner

*Primary Examiner* — John Kwon
*Assistant Examiner* — Johnny H Hoang
(74) *Attorney, Agent, or Firm* — Nixon & Vanderhye P.C.

(57) ABSTRACT

In a low-pressure EGR system, a mechanical stopper limits a rotation range of a low-pressure EGR regulating valve at a limit opening degree of the low-pressure EGR regulating valve on its fully-open side and outside an EGR amount adjustment opening degree range of the low-pressure EGR regulating valve. After an engine is stopped, a failure detection unit rotates the low-pressure EGR regulating valve to its fully-open position to such an extent that rotation of a linking device is prevented by the mechanical stopper, and is configured to determine that a failure has occurred when an opening degree of the low-pressure EGR regulating valve detected by a low-pressure EGR opening sensor is different from the limit opening degree of the low-pressure EGR regulating valve.

5 Claims, 6 Drawing Sheets

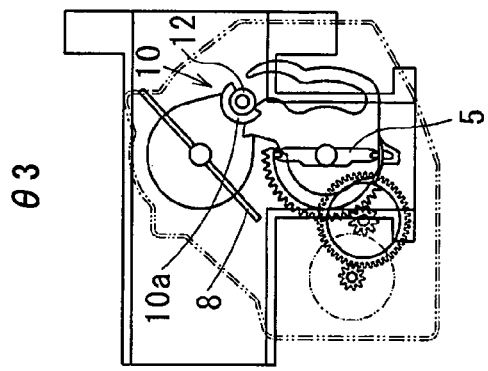
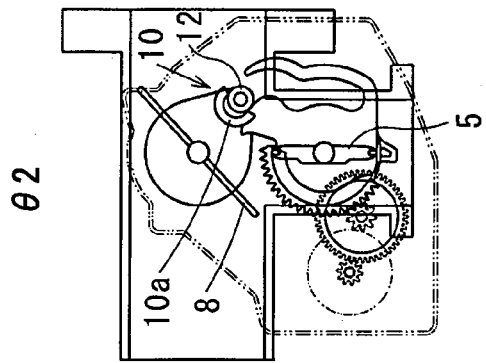
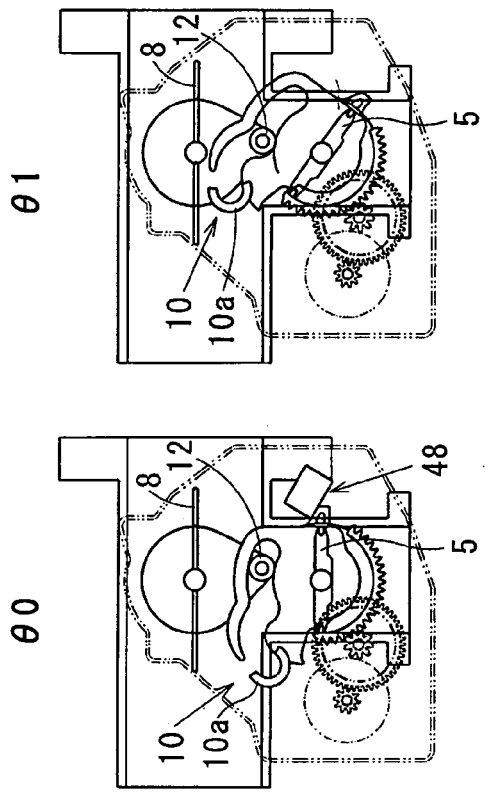
FIG. 3A  FIG. 3B  FIG. 3C  FIG. 3D

LOW-PRESSURE EXHAUST GAS RECIRCULATION SYSTEM

CROSS REFERENCE TO RELATED APPLICATION

This application is based on Japanese Patent Application No. 2011-238989 filed on Oct. 31, 2011, the disclosure of which is incorporated herein by reference.

TECHNICAL FIELD

The present disclosure relates to a low-pressure exhaust gas recirculation (EGR) system that returns a part of exhaust gas from an engine (internal combustion engine which generates power by combustion of fuel) from a low exhaust pressure range (range in which exhaust pressure is low) of an exhaust passage into a low intake air negative pressure generation range (range in which negative pressure of intake air is low) of an intake passage.

BACKGROUND

There is proposed a technology for making a failure determination of an intake throttle valve (valve device that generates negative pressure of intake air at a merging part of the intake passage and the low-pressure EGR passage) by means of a low-pressure EGR opening sensor that detects an opening degree of a low-pressure EGR regulating valve (valve device that regulates an opening degree of a low-pressure EGR passage leading to an intake passage) (see JP-A-2011-032929 corresponding to US2011/0023846A1).

According to this technology described in JP-A-2011-032929, mechanical stopper which restricts a limit opening degree of a linking device (specifically, engagement part between an end portion of a cam groove and a roller) is provided on a fully-closed side of the low-pressure EGR regulating valve in the linking device. After an engine stops, the low-pressure EGR regulating valve is rotated on the fully-closed side, and the movement of the linking device is thereby stopped by the mechanical stopper. In other words, the low-pressure EGR regulating valve is rotated on the fully-closed side up to a range in which the movement of the linking device is restricted by the mechanical stopper. If the opening degree detected by the low-pressure EGR opening sensor is the limit opening degree of the mechanical stopper, it is determined that the intake throttle valve is normal. If it is an opening degree that is different from the limit opening degree, it is determined that a failure has occurred in the intake throttle valve.

According to this technology in JP-A-2011-032929, the fully-closed position of the EGR valve and the limit opening degree of the mechanical stopper may be set at the same opening degree. The low-pressure EGR regulating valve is very often returned to the fully-closed position when the engine is in operation as well as at the time of the engine stop. For this reason, each time the low-pressure EGR regulating valve is returned to the fully-closed position, stress (pressing load) is applied to the mechanical stopper. As a result, the stress is applied to the mechanical stopper many times for a long period of time, and there is concern that strength of the mechanical stopper is reduced.

SUMMARY

According to the present disclosure, there is provided a low-pressure exhaust gas recirculation (EGR) system for an engine having an intake passage which guides intake air into the engine. The system includes a low-pressure EGR passage, a low-pressure EGR regulating valve, an electric actuator, a low-pressure EGR opening sensor, a control device, an intake throttle valve, a linking device, a mechanical stopper, and a failure detection unit. The low-pressure EGR passage guides EGR gas into the intake passage. The low-pressure EGR regulating valve is configured to regulate an opening degree of the low-pressure EGR passage. The electric actuator is configured to drive the low-pressure EGR regulating valve. The low-pressure EGR opening sensor is configured to detect an opening degree of the low-pressure EGR regulating valve. The control device is configured to control energization of the electric actuator so as to control the opening degree of the low-pressure EGR regulating valve. The intake throttle valve is configured to generate a negative pressure of intake air at a merging part of the intake passage and the low-pressure EGR passage. The linking device is configured to change an output characteristic of the electric actuator so as to drive the intake throttle valve. The mechanical stopper is provided for the linking device and is configured to limit a rotation range of the low-pressure EGR regulating valve at a limit opening degree of the low-pressure EGR regulating valve on its fully-open side and outside an EGR amount adjustment opening degree range of the low-pressure EGR regulating valve. The failure detection unit is provided for the control device. After the engine is stopped, the failure detection unit rotates the low-pressure EGR regulating valve to its fully-open position to such an extent that rotation of the linking device is prevented by the mechanical stopper, and is configured to determine that a failure has occurred when the opening degree of the low-pressure EGR regulating valve detected by the low-pressure EGR opening sensor is different from the limit opening degree of the low-pressure EGR regulating valve.

BRIEF DESCRIPTION OF THE DRAWINGS

The above and other objects, features and advantages of the present disclosure will become more apparent from the following detailed description made with reference to the accompanying drawings. In the drawings:

FIG. 3A is a diagram illustrating a opening degree of the intake throttle valve in accordance with the rotation angle of the low-pressure EGR regulating valve according to the first embodiment;

FIG. 3B is a diagram illustrating the opening degree of the intake throttle valve in accordance with the rotation angle of the low-pressure EGR regulating valve according to the first embodiment;

FIG. 3C is a diagram illustrating the opening degree of the intake throttle valve in accordance with the rotation angle of the low-pressure EGR regulating valve according to the first embodiment;

FIG. 3D is a diagram illustrating the opening degree of the intake throttle valve in accordance with the rotation angle of the low-pressure EGR regulating valve according to the first embodiment;

DETAILED DESCRIPTION

Figure 1:
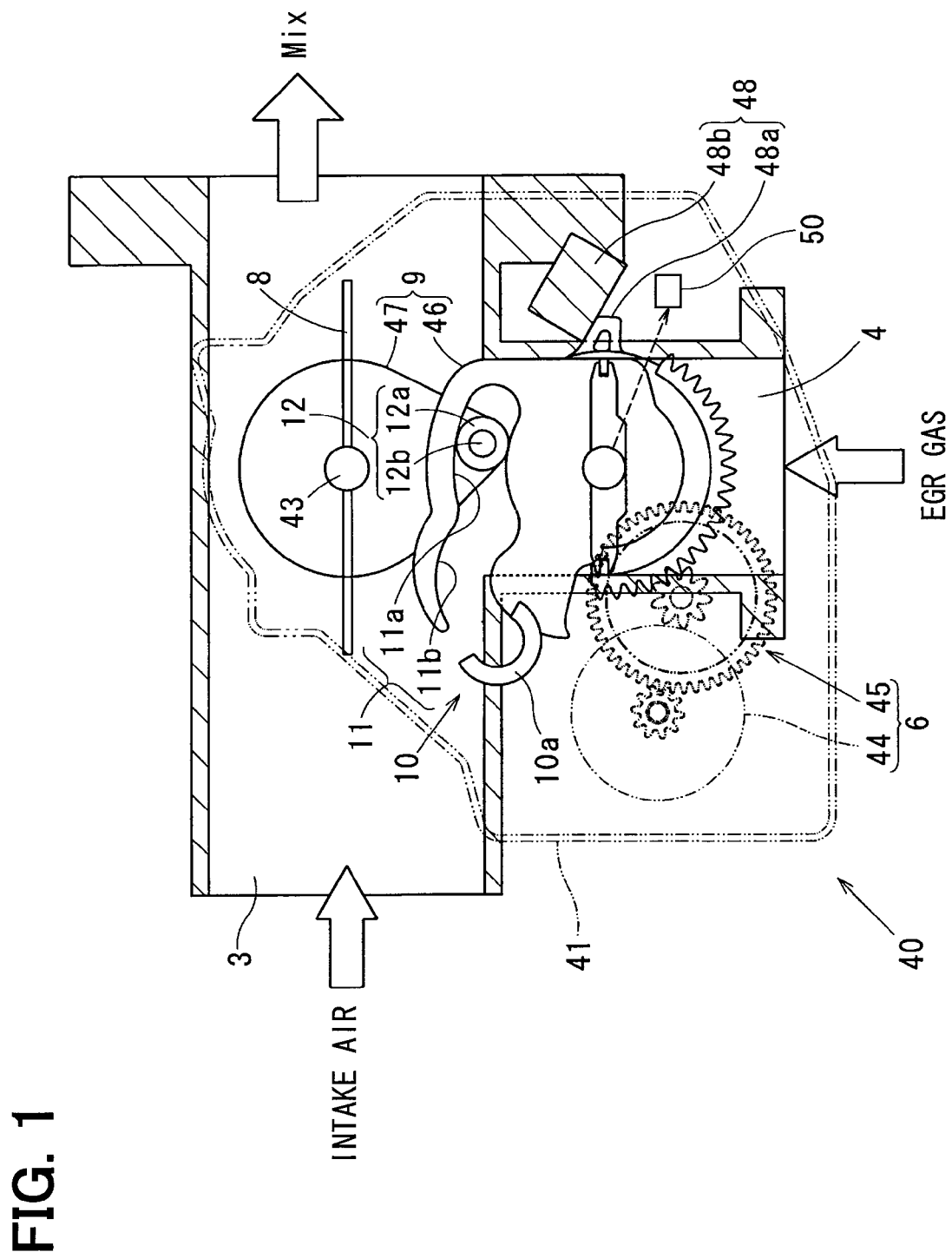
FIG. 1 is a schematic diagram illustrating a low-pressure EGR regulating valve and an intake throttle valve in accordance with a first embodiment.
Figure 2:
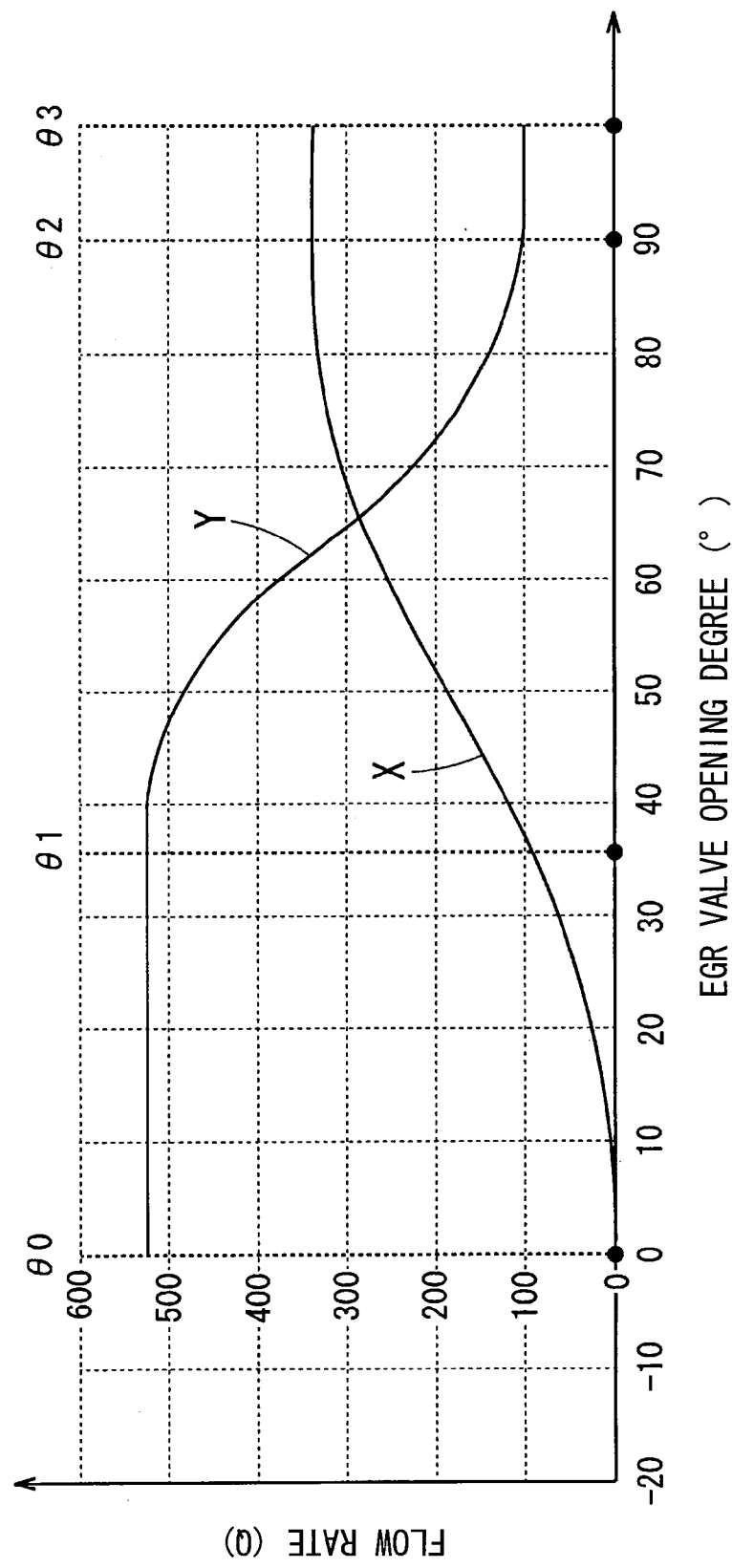
FIG. 2 is a graph illustrating a relationship between an EGR flow rate and an intake flow rate in accordance with a rotation angle of the low-pressure EGR regulating valve according to the first embodiment.

Embodiments will be described below with reference to the accompanying drawings. A low-pressure EGR system 1 includes the following components: (a) a low-pressure EGR regulating valve 5 that regulates an opening degree of a low-pressure EGR passage 4 leading EGR gas into an intake passage 3, which guides intake air to an engine 2; (b) one electric actuator 6 that drives the low-pressure EGR regulating valve 5; (c) a low-pressure EGR opening sensor 50 that detects an opening degree of the low-pressure EGR regulating valve 5; (d) a control device 7 that controls energization of the electric actuator 6 to control the opening degree of the low-pressure EGR regulating valve 5 (ECU 7 in embodiments described below); (e) an intake throttle valve 8 which generates negative pressure of intake air at at a merging part of the intake passage 3 and the low-pressure EGR passage 4; (f) a linking device 9 that changes output characteristics of the electric actuator 6 to drive the intake throttle valve 8; (g) a mechanical stopper 10 that is provided for this linking device 9 to limit a fully-open side limit opening degree θ3 of the low-pressure EGR regulating valve 5 outside an EGR amount adjustment opening degree range θ0 to θ2 (engagement position between an end portion of a cam groove 11 and a groove engaging body 12 in embodiments described below); and (h) a failure detection means (failure detection unit) that is provided for the control device 7 and rotates the low-pressure EGR regulating valve 5 to be fully-open to such an extent that rotation of the linking device 9 is prevented by the mechanical stopper 10 after the engine 2 is stopped (control program provided for the ECU 7 in embodiments described below), the failure detection means making a failure determination if the opening degree detected by the low-pressure EGR opening sensor 50 is different from the limit opening degree θ3 of the linking device 9.

The embodiment discloses a concrete example, and needless to say, the disclosure is not limited to the embodiment.

First Embodiment

A first embodiment will be described below in reference to FIGS. 1 to 5. First, an engine intake and exhaust system will be explained in reference to FIG. 5. A high-pressure EGR system 21 and a low-pressure EGR system 1 are provided for the engine intake and exhaust system. The high-pressure EGR system 21 is an exhaust gas recirculation system that connects together an inside of an exhaust passage 23 in a high exhaust pressure range (range on an upstream side of a diesel particulate filter (DPF) 22 in an exhaust gas flow direction, and high exhaust pressure is generated in this range), and an inside of an intake passage 3 in a high intake air negative pressure generation range (range on a downstream side of a throttle valve 24 in an intake air flow direction, and high negative pressure of intake air is generated in this range), so as to return a large amount of EGR gas into an engine 2. The system 21 includes a high-pressure EGR passage 25 that returns a part of exhaust gas as EGR gas to a downstream side of the intake passage 3 in the intake air flow direction. For a specific example, in FIG. 5, the high-pressure EGR passage 25 on the exhaust passage 23 side is connected to an upstream side of an exhaust turbine 26 of a turbocharger in the exhaust gas flow direction (exhaust manifold), and the passage 25 on the intake passage 3 side is connected to a surge tank 27 of an intake manifold.

Figure 5:
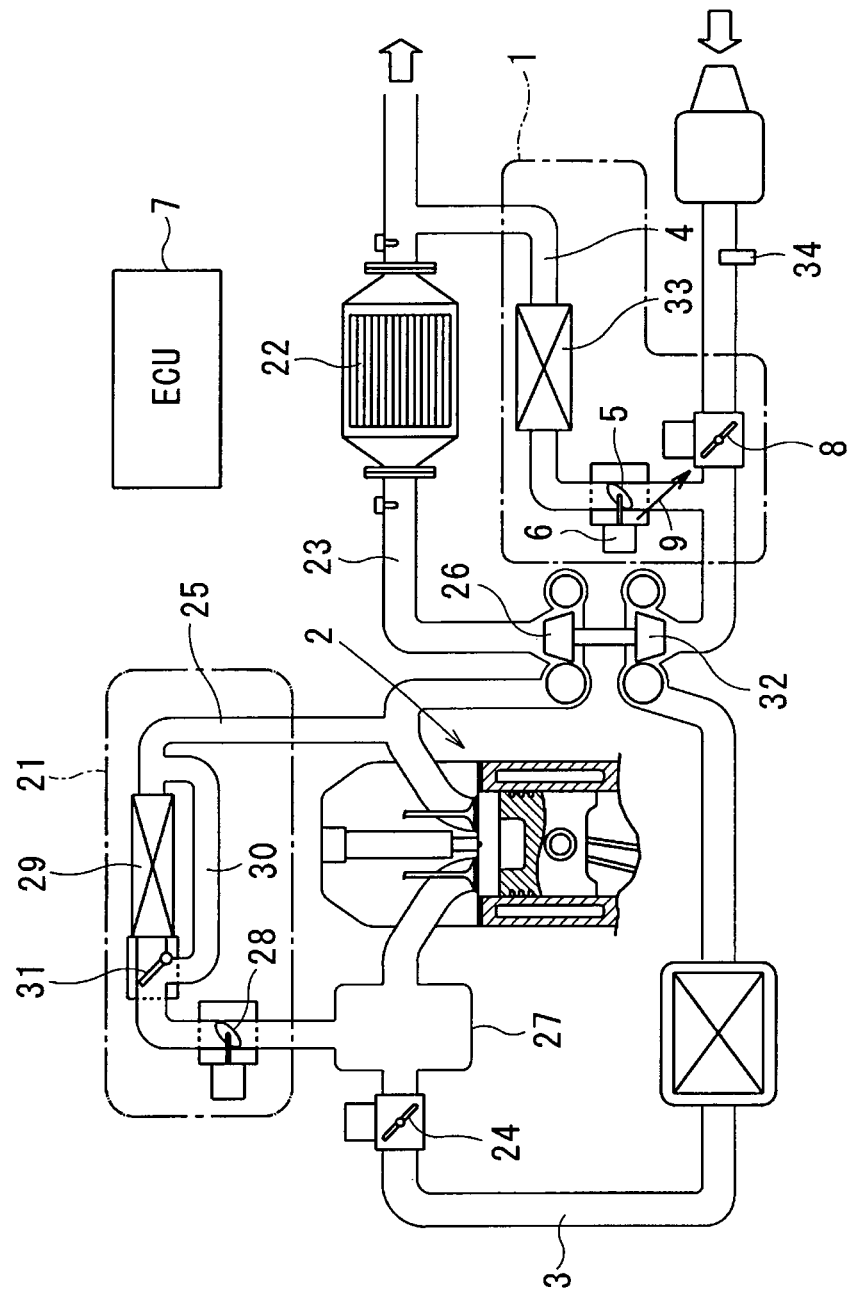
FIG. 5 is a diagram roughly illustrating an intake and exhaust system of an engine according to the first embodiment.

Along the high-pressure EGR passage 25, the high-pressure EGR system 21 illustrated in FIG. 5 includes a high-pressure EGR regulating valve 28 that regulates a flow rate of EGR gas through adjustment of an opening degree of the high-pressure EGR passage 25, a high-pressure EGR cooler 29 that cools EGR gas to be returned to the air-intake side, a high-pressure cooler bypass 30 that bypasses the EGR gas to be returned to the air-intake side from the high-pressure EGR cooler 29, and a high-pressure EGR cooler changeover valve 31 that switches between the high-pressure EGR cooler 29 and the high-pressure cooler bypass 30. FIG. 5 is only a concrete example, and the high-pressure EGR system 21 may not include the high-pressure EGR cooler 29, the high-pressure cooler bypass 30, or the high-pressure EGR cooler changeover valve 31.

The low-pressure EGR system 1 is is an exhaust gas recirculation system that connects together the inside of the exhaust passage 23 in a low exhaust pressure range (range on a downstream side of the DPF 22 in the exhaust gas flow direction, and low exhaust pressure is generated in this range), and the inside of the intake passage 3 in a low intake air negative pressure generation range (range on an upstream side of the throttle valve 24 in the intake air flow direction; low negative pressure of intake air is generated in this range), so as to return a small amount of EGR gas into the engine 2. The system 1 includes a low-pressure EGR passage 4 that returns a part of exhaust gas as EGR gas to the upstream side of the intake passage 3 in the intake air flow direction. As a specific example, the low-pressure EGR passage 4 in FIG. 5 on the exhaust passage 23 side is connected to an exhaust pipe on a downstream side of the DPF 22 in the exhaust gas flow direction, and the passage 4 on the intake passage 3 side is connected to an intake pipe on an upstream side of a compressor 32 of the turbocharger in the intake air flow direction.

Along the low-pressure EGR passage 4, the low-pressure EGR system 1 includes a low-pressure EGR regulating valve 5 that regulates a flow rate of EGR gas through adjustment of an opening degree of the low-pressure EGR passage 4, and a low-pressure EGR cooler 33 that cools EGR gas to be returned to the air-intake side. Moreover, the low-pressure EGR system 1 includes an intake throttle valve 8 for generating a negative pressure of intake air at a merging part of the intake passage 3 and the low-pressure EGR passage 4.

This intake throttle valve 8 is configured to open a part of the intake passage 3 even in a state where the intake passage 3 is reduced to a maximum extent. Specifically, the valve 8 is configured to open, for example, about 10% of the intake passage 3 even in a state where the intake throttle valve 8 reduces the intake passage 3 to a maximum extent (see the smallest flow rate of a continuous line Y in FIG. 2).

The high-pressure EGR system 21 and the low-pressure EGR system 1 are controlled by an engine control unit (ECU) 7. This ECU 7 is an engine control device using a microcomputer, and includes an EGR control program that controls operations of the high-pressure EGR system 21 and the low-pressure EGR system 1 in accordance with an engine operating state. Specifically, operation of each part of the high-pressure EGR system 21 and the low-pressure EGR system 1 is controlled based on the engine operating state inputted from sensors and the control program provided for the ECU 7.

The low-pressure EGR system 1 is for returning the EGR gas in the low exhaust pressure range into the low intake air negative pressure generation range, so that a small amount of EGR gas can be controlled and returned into the engine 2. Therefore, although there is an operating range in which a large amount of EGR gas needs to be returned to the engine 2 by means of the low-pressure EGR system 1, it is difficult to return the large amount of EGR gas to the engine 2 by the low-pressure EGR system 1 having the structure that returns EGR gas to the low intake air negative pressure generation range. Accordingly, the intake throttle valve 8 for actively generating the negative pressure of intake air is provided for the low-pressure EGR system 1 in the intake passage 3, into which EGR gas is returned. In the operating range in which the large amount of EGR gas is required for the low-pressure EGR system 1, an opening degree of the intake throttle valve 8 is controlled in a direction to close the intake throttle valve 8 (direction in which the negative pressure of intake air is generated). As a result, the large amount of EGR gas is controlled in the low-pressure EGR system 1.

However, (i) in a low concentration control state in which a small amount of EGR gas is returned to the engine 2 by means of the low-pressure EGR system 1, the intake throttle valve 8 is fixed at the maximum degree of opening (fully-open opening degree) not to generate a negative pressure, and thus only an opening degree of the low-pressure EGR regulating valve 5 needs to be controlled; and (ii) in a high concentration control state in which a large amount of EGR gas is returned to the engine 2 by means of the low-pressure EGR system 1, the opening degree of the intake throttle valve 8 needs to be made small to increase the negative pressure with the opening degree of the low-pressure EGR regulating valve 5 increased.

As described above, in the low concentration control state, the intake throttle valve 8 is fixed at the fully-open position, and only an opening degree of the low-pressure EGR regulating valve 5 is controlled; and in the high concentration control state, the opening degree of the intake throttle valve 8 needs to be controlled corresponding to the opening degree of the low-pressure EGR regulating valve 5. For this reason, an actuator exclusively for driving the low-pressure EGR regulating valve 5, and an actuator exclusively for driving the intake throttle valve 8 are required. Accordingly, if dedicated actuators are provided for the respective valves, cost rising, size increase, and weight increase of the system 1 are caused.

Accordingly, the low-pressure EGR system 1 includes as illustrated in FIG. 1, one electric actuator 6 for driving the low-pressure EGR regulating valve 5, and a linking device 9 that changes output characteristics of this electric actuator 6 to drive the intake throttle valve 8. The intake throttle valve 8 is driven by the output of the electric actuator 6 transmitted through the linking device 9.

A characteristic converter that changes the output characteristics of the electric actuator 6 to transmit the output to the intake throttle valve 8 is provided for the linking device 9. After the opening degree of the low-pressure EGR regulating valve 5 becomes larger than a predetermined opening degree, the opening degree of the intake throttle valve 8 is reduced in synchronization with the increase of the opening degree of the valve 5 (see FIG. 2). A continuous line X in FIG. 2 indicates a change of an EGR flow rate with respect to a rotation angle of the low-pressure EGR regulating valve 5. The continuous line Y in FIG. 2 indicates a change of an intake flow rate through the intake throttle valve 8 relative to the rotation angle of the low-pressure EGR regulating valve 5.

A low-pressure EGR valve unit 40 will be explained below. As described above, the low-pressure EGR regulating valve 5 and the intake throttle valve 8 are connected together through the linking device 9, and are driven by the common electric actuator 6. Accordingly, as illustrated in FIG. 1, the low-pressure EGR regulating valve 5 and the intake throttle valve 8 are configured as the one low-pressure EGR valve unit 40.

In this low-pressure EGR valve unit 40, the low-pressure EGR regulating valve 5, the intake throttle valve 8, the electric actuator 6, and the linking device 9, which are described above, are disposed in a valve housing 41 including a merging part of the low-pressure EGR passage 4 and the intake passage 3. In the following description, the low-pressure EGR regulating valve 5, the intake throttle valve 8, the electric actuator 6, and the linking device 9, which are disposed in the low-pressure EGR valve unit 40, will be roughly explained in turn.

The low-pressure EGR regulating valve 5 is a butterfly valve arranged in the low-pressure EGR passage 4, and is rotated integrally with a low-pressure EGR shaft 42 which is rotatably supported by the valve housing 41. The intake throttle valve 8 is a butterfly valve arranged in the intake passage 3, and is rotated integrally with an intake throttle shaft 43 which is rotatably supported by the valve housing 41. The low-pressure EGR shaft 42 and the intake throttle shaft 43 are arranged in parallel with each other.

The electric actuator 6 is obtained by combination of an electric motor 44 (e.g., DC motor) that generates a rotation output upon energization, and a deceleration mechanism 45 (e.g., mechanical reduction gear) that decelerates the rotation output of this electric motor 44 to increase output torque. By the output of the deceleration mechanism 45, the low-pressure EGR regulating valve 5 is driven, and the intake throttle valve 8 is driven through the linking device 9.

The linking device 9 converts the output characteristics (rotation characteristics) of the electric actuator 6 to drive the intake throttle valve 8. The device 9 includes a female side member (cam plate) 46 which is rotated integrally with the low-pressure EGR regulating valve 5, and a male side member (driven arm) 47 which is rotated integrally with the intake throttle valve 8.

The female side member 46 is a cam plate having a plate shape and formed from a material excellent in wear resistance, and is fixed and arranged perpendicular to the low-pressure EGR shaft 42. The male side member 47 is also a driven arm having a plate shape and formed from a material excellent in wear resistance. The member 47 is fixed and arranged perpendicular to the intake throttle shaft 43 such that a rotatable end side of the male side member 47 overlaps with the female side member 46 with a predetermined clearance therebetween.

The characteristic converter of the linking device 9 that converts the output characteristics of the electric actuator 6 includes a cam groove 11 provided away from the rotation center of the female side member 46, and a groove engaging body 12 provided away from the rotation center of the male side member 47 and fitted in the cam groove 11. The groove engaging body 12 includes a cylindrical roller 12a (rotational difference absorber) fitted in the cam groove 11, and a pin (shaft portion) 12b fixed on the rotatable end side of the male side member 47 and rotatably holding the roller 12a. The pin 12b which supports the roller 12a may be formed integrally with the male side member 47. Alternatively, the pin 12b may be separately formed and then, the pin 12b may be fixed to the male side member 47.

A cam profile of the cam groove 11 is provided by connecting together a cam groove 11a for keeping a fully-open position and a cam groove 11b for changing the opening degree. The cam groove 11a for keeping the fully-open position is a circular arc groove having the same center as the rotation center of the female side member 46. The cam groove 11*a* is configured to maintain the opening degree of the intake throttle valve 8 at the maximum opening degree in a rotation range (opening degree θ0 to opening degree θ1) in which the low-pressure EGR regulating valve 5 reaches a predetermined intermediate opening degree θ1 from a fully-closed opening degree θ0 (EGR valve opening degree=0 degrees in FIG. 2) at which the valve 5 reduces the low-pressure EGR passage 4 to a maximum extent.

The cam groove 11*b* for changing the opening degree is formed continuously with one end portion of the above cam groove 11*a* for keeping the fully-open position. The cam groove 11*b* has an angle shape that changes at a predetermined angle as opposed to the circular arc groove having the same center as the rotation center of the female side member 46. In a rotation range (opening degree θ1 to opening degree θ2) in which the low-pressure EGR regulating valve 5 reaches the maximum opening degree (θ2: the EGR valve opening degree=90 degrees in FIG. 2) from the predetermined intermediate opening degree (θ1), the groove 11*b* rotates the male side member 47 and the opening degree of the intake throttle valve 8 is thereby rotated from the maximum opening degree in a direction in which the intake passage 3 is closed.

A return spring for the low-pressure EGR valve that urges the low-pressure EGR regulating valve 5 in a valve-closing direction is provided for the low-pressure EGR valve unit 40. The low-pressure EGR regulating valve 5 closes the low-pressure EGR passage 4 in a state in which the energization of the electric actuator is stopped. In addition, an EGR valve stopper 48 that limits the minimum opening degree of the low-pressure EGR regulating valve 5 to the fully-closed position is provided for the low-pressure EGR valve unit 40. This EGR valve stopper 48 limits the minimum angle of the female side member 46 to 0 degrees. Through the contact of a projection 48*a* of the female side member 46 with a projection 48*b* of the valve housing 41, the minimum opening degree of the low-pressure EGR regulating valve 5 is limited to the fully-closed position.

In the case of use of the structure whereby the output of the electric actuator 6 is transmitted to the intake throttle valve 8 through the linking device 9 as in this first embodiment, the failure of the intake throttle valve 8 needs to be determined on the assumption that some defect (e.g., the female side member 46 or the male side member 47 may come off due to looseness of a securing nut or the like, the engagement between the cam groove 11 and the groove engaging body 12 may be separated, or the cam groove 11 and the groove engaging body 12 may be engaged and firmly fixed with each other due due to their hooking-up or the like) occurs by any possibility in the linking device 9, and the intake throttle valve 8 thereby fails to operate properly (the intake throttle valve 8 becomes uncontrollable).

Accordingly, in order to determine the failure of the intake throttle valve 8, an independent opening sensor that detects the opening degree of the intake throttle valve 8 may be provided separately from the low-pressure EGR regulating valve 5. However, the possibility of the failure of the intake throttle valve 8 is very low. For this reason, if the opening sensor is provided exclusively for the intake throttle valve 8, a cost rising is caused and cost performance becomes very small.

Characteristic technologies of the first embodiment will be described below. The low-pressure EGR system 1 of this first embodiment employs the following technical means. As described above, the low-pressure EGR system 1 includes the low-pressure EGR regulating valve 5 that regulates the opening degree of the low-pressure EGR passage 4 leading the EGR gas into the intake passage 3, which guides intake air to the engine 2, the one electric actuator 6 that drives the low-pressure EGR regulating valve 5, the ECU 7 that controls the energization of the electric actuator 6 to control the opening degree of the low-pressure EGR regulating valve 5, the intake throttle valve 8 which generates negative pressure of intake air at the merging part of the intake passage 3 and the low-pressure EGR passage 4, and the linking device 9 that changes the output characteristics of the electric actuator 6 to drive the intake throttle valve 8.

In addition, the low-pressure EGR system 1 includes a low-pressure EGR opening sensor 50 that detects the opening degree of the low-pressure EGR regulating valve 5, a mechanical stopper 10 that is provided for the linking device 9 and that limits a fully-open side limit opening degree θ3 of the low-pressure EGR regulating valve 5 outside an EGR amount adjustment opening degree range θ0 to θ2 (range of 0 degrees to 90 degrees), and a failure detection means (control program) that is provided for the ECU 7. The failure detection means is for determining that the intake throttle valve 8 is uncontrollable due to the failure of the linking device 9 or the like.

The low-pressure EGR opening sensor 50 is disposed at one axial end of the low-pressure EGR shaft 42 to detect the opening degree of the low-pressure EGR regulating valve 5 based on the angle of the low-pressure EGR shaft 42. As a specific example, the low-pressure EGR opening sensor 50 includes a permanent magnet on its relatively-rotating one side (e.g., side of a rotatable member that rotates integrally with the low-pressure EGR shaft 42), and the low-pressure EGR opening sensor 50 further includes a magnetic sensor such as a Hall IC on its relatively-rotating other side (e.g., side of a fixing member such as a cover attached to the valve housing 41). The low-pressure EGR opening sensor 50 detects the rotation angle of the low-pressure EGR shaft 42 in a contactless manner using a flux change given to the magnetic sensor. A detection result (output of the Hall IC) is outputted to the ECU 7.

As illustrated in FIG. 3D, the mechanical stopper 10 prevents the rotation of the linking device 9 when the roller 12*a* is pushed on a roller engagement member 10*a* having a generally arc shape provided at the end portion of the cam groove 11 (end portion of the cam groove 11*b* for changing the opening degree on the different side from the cam groove 11*a* for keeping the fully-open position). Specifically, as indicated by a short dashes line θ3 in FIG. 2, the fully-open side limit opening degree θ3 of the low-pressure EGR regulating valve 5 by the mechanical stopper 10 is set such that the member 10*a* is engaged with the roller 12*a* at a rotation angle (+α degrees: e.g., 5 degrees to 10 degrees) that is larger than the maximum opening degree θ2 (90 degrees) in the EGR amount adjustment opening degree range θ0 to θ2 of the low-pressure EGR regulating valve 5.

The failure detection means is a part of the control program in the ECU 7, and includes (i) a link failure determination program whereby after the engine 2 stops, the low-pressure EGR regulating valve 5 is rotated to be fully-open to the range in which the rotation of the linking device 9 is prevented by the mechanical stopper 10, and if the opening degree detected by the low-pressure EGR opening sensor 50 is different from the limit opening degree θ3 of the linking device 9, the failure of the intake throttle valve 8 is determined; and (ii) air-intake defect determination program whereby while the engine is in operation, a state of intake air into the engine 2 (e.g., actual intake flow rate, supercharging pressure, intake air temperature, actual EGR flow rate, opening degree of the low-pressure EGR regulating valve 5) is detected, and the failure of the intake throttle valve 8 is determined if an occurrence of an air-intake defect is detected or if the air-intake defect is predicted based on the detection result.

Figure 4:
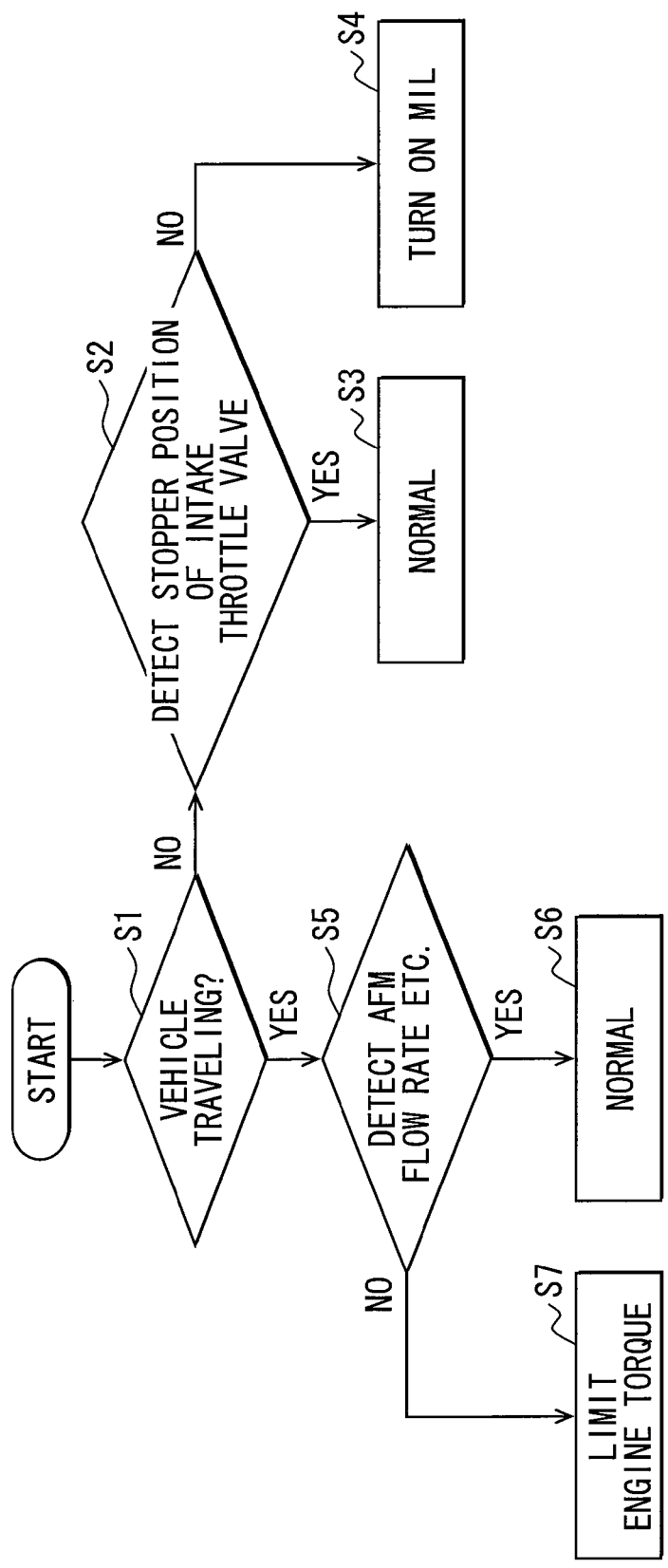
FIG. 4 is a flow chart showing an example of failure detection according to the first embodiment.

Examples of control of the link failure determination program and the air-intake defect determination program will be explained in reference to FIG. 4. On entering this control routine (start), first, it is determined whether the engine 2 is in operation (vehicle traveling in FIG. 4) (S1). If a determination result at S1 is NO (operation of the engine 2 is stopped), the low-pressure EGR regulating valve 5 is rotated to its fully-open side to the range in which the movement of the linking device 9 is restricted by the mechanical stopper 10, and it is determined whether the opening degree detected by the low-pressure EGR opening sensor 50 is the limit opening degree $\theta 3$ (90 degrees+$\alpha$) of the opening degree of the low-pressure EGR regulating valve 5 limited by the mechanical stopper 10 (S2).

If a result of this determination at S2 is YES (if the opening degree detected by the low-pressure EGR opening sensor 50 is the limit opening degree $\theta 3$), it is determined that there is no abnormality (S3). After that, this control routine is ended. If the result of the determination at S2 is NO (if the opening degree detected by the low-pressure EGR opening sensor 50 is different from the limit opening degree $\theta 3$), it is determined that an abnormality is created in the intake throttle valve 8 due to a link failure of the linking device 9 or the like. The occurrence of abnormality is thereby indicated such as turning-on of a warning lamp (S4), and after that, this control routine is ended.

If the determination result at S1 is YES (if the engine 2 is in operation), it is determined whether the actual intake flow rate detected by an air flow meter 34 (air-intake sensor disposed in the intake passage 3 to detect the intake flow rate) coincides generally with a target intake flow rate corresponding to the engine operating state (S5).

If a result of this determination at S5 is YES (if the actual intake flow rate and the target intake flow rate are generally the same), it is determined that there is no abnormality (S6). After that, this control routine is ended. If the result of the determination at S5 is NO (if the actual intake flow rate does not coincide with the target intake flow rate), it is determined that the intake throttle valve 8 is likely to be at fault. Accordingly, the engine 2 is controlled into an evacuation travelling state such as limited engine torque (S7). After that, this control routine is ended.

In the above example of control, for a specific example for detecting a failure of the intake throttle valve 8 while the engine is in operation, the detection of the actual intake flow rate by the air flow meter 34, and the determination of the failure of the valve 8 while the engine is in operation based on a relationship with the target intake flow rate, which is calculated based on the engine operating state, are illustrated. Alternatively, the supercharging pressure and intake air temperature may be detected; the amount of suction air into a cylinder may be obtained based on the detected supercharging pressure and intake air temperature; and the failure of the valve 8 while the engine is in operation may be determined based on a relationship with the actual intake flow rate detected by the air flow meter 34. Or, the actual EGR flow rate may be calculated from, for example, the actual intake flow rate detected by the air flow meter 34; and the failure of the valve 8 while the engine is in operation may be determined based on a relationship between the calculated actual EGR flow rate and a target EGR flow rate (opening degree of the low-pressure EGR regulating valve 5) that is in accordance with the engine operating state.

A first effect of the first embodiment will be described. In the low-pressure EGR system 1 of this first embodiment, the movement of the linking device 9 is restricted by the mechanical stopper 10 only when the failure determination is performed after the engine is stopped. For this reason, a frequency of the application of stress to the mechanical stopper 10 can be reduced. Accordingly, the strength reduction of the mechanical stopper 10 is avoidable despite a prolonged use of the low-pressure EGR system 1, and reliability of the low-pressure EGR system 1 can thereby be improved.

Specifically, the end portion of the cam groove 11 presses the groove engaging body 12 (the roller 12a and the pin 12b) to limit the movement of the linking device 9 only at the time of the engine stop for carrying out the failure determination, and its frequency is low. Accordingly, despite the prolonged use, deformation or damage of the end portion of the cam groove 11 and the groove engaging body 12 can be prevented, and the reliability of the low-pressure EGR system 1 can thereby be improved.

A second effect of the first embodiment will be described. The low-pressure EGR system 1 of this first embodiment includes the air-intake defect determination program. Accordingly, if the intake throttle valve 8 should be at fault while the engine is in operation, the engine torque can be limited to perform the evacuation travelling.

Second Embodiment

Figure 6:
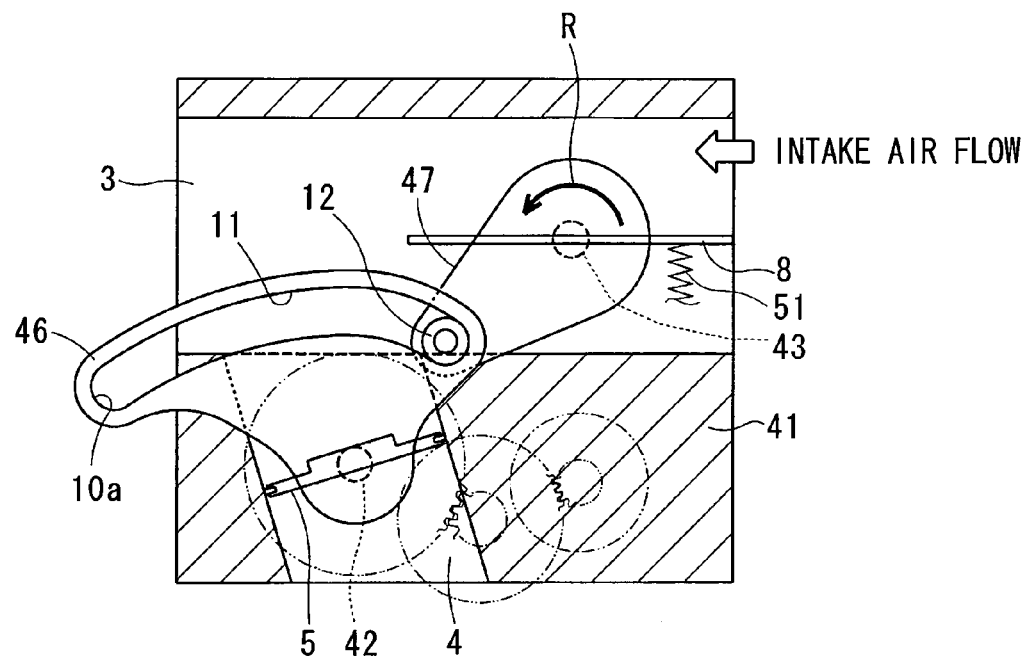
FIG. 6 is a schematic diagram illustrating a low-pressure EGR regulating valve and an intake throttle valve in accordance with a second embodiment.

A second embodiment will be described with reference to FIG. 6. In the following embodiment, the same numeral as in the above first embodiment indicates its corresponding functional component. A low-pressure EGR system 1 of this second embodiment includes a throttle valve return spring 51 that urges an intake throttle valve 8 in its valve-opening direction (see a reference R in FIG. 6) to stop the intake throttle valve 8 in its valve-opening state (fully-open position or opening degree position at which the valve 8 is generally fully open).

Accordingly, even if the intake throttle valve 8 cannot be controlled such as a failure of a linking device 9, the intake throttle valve 8 is stopped at its open position through an operation of the throttle valve return spring 51. As a result, a malfunction such as an air-intake defect or supercharging pressure defect because the valve 8 is fixed on a side on which an intake passage 3 is closed can be avoided. Therefore, a fail-safe can be achieved by the throttle valve return spring 51.

Third Embodiment

Figure 7:
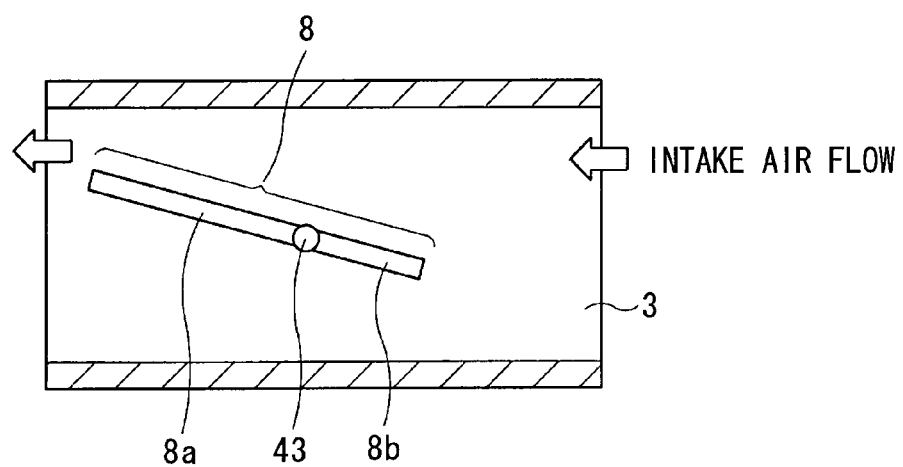
FIG. 7 is a diagram illustrating a shape of an intake throttle valve in accordance with a third embodiment.

A third embodiment will be described with reference to FIG. 7. An intake-air contact area of a downstream valve plate 8a of a butterfly valve, which is configured as an intake throttle valve 8, is larger than an intake-air contact area of an upstream valve plate 8b of the butterfly valve. The plate 8a is disposed on a downstream side of an intake throttle shaft 43 (corresponding to a rotatable shaft of the butterfly valve) in the intake air flow direction, and the plate 8b is disposed on an upstream side of the intake throttle shaft 43 in the intake air flow direction. Specifically, as illustrated in FIG. 7, a length of the downstream valve plate 8a in the streamline direction is longer than a length of the upstream valve plate 8b in the streamline direction.

Accordingly, even if the intake throttle valve 8 cannot be controlled such as a failure of a linking device 9, the intake throttle valve 8 is rotated to the side on which an intake passage 3 is opened by a suction flow in an intake passage 3. As a result, a malfunction such as an air-intake defect or supercharging pressure defect because the valve 8 is fixed on a side on which an intake passage 3 is closed can be avoided. Thus, by using the butterfly valve whose valve shape is imbalanced for the intake throttle valve 8, a fail-safe can be achieved. Industrial applicability of the low-pressure EGR system 1 will be described below.

In the above-described embodiments, it is illustrated that the cam groove 11 is used for an example of the linking device 9 that arbitrarily changes the output characteristics of the electric actuator 6. Alternatively, another means, such as a replacement of the cam groove 11 with a cam mountain, may be used as a means for changing the output characteristics of the electric actuator 6.

In the above embodiments, it is illustrated that the present disclosure is applied to the engine intake and exhaust system including the turbocharger. Alternatively, the present disclosure may be applied to an engine intake and exhaust system including another intake air supercharger instead of the turbocharger, or the present disclosure may be applied to an engine intake and exhaust system without the intake air supercharger.

In the above embodiments, an example of the application of the present disclosure to an intake and exhaust system for a diesel engine is illustrated. Alternatively, the present disclosure may be applied to an intake and exhaust system for another engine which is different from the diesel engine (e.g., gasoline engine).

To sum up, the low-pressure EGR system 1 of the above embodiments can be described as follows.

According to the first aspect, when the engine 2 stops, the low-pressure EGR regulating valve 5 is rotated on its fully-open side to a range in which the movement of the linking device 9 is restricted by the mechanical stopper 10. If the opening degree detected by the low-pressure EGR opening sensor 50 is an opening degree that is different from the limit opening degree $\theta 3$, it is determined that a failure has occurred. As above, a failure determination of the intake throttle valve 8 is made by the low-pressure EGR opening sensor 50 that detects the opening degree of the low-pressure EGR regulating valve 5. Accordingly, an opening sensor exclusively for the intake throttle valve 8 can be rendered unnecessary, and the costs of the low-pressure EGR system 1 can thereby be reduced.

The movement of the linking device 9 is restricted by the mechanical stopper 10 when the failure determination is performed after the engine 2 is stopped. As a result, a frequency of the application of stress to the mechanical stopper 10 can be reduced. Accordingly, the strength reduction of the mechanical stopper 10 is avoidable despite a prolonged use of the low-pressure EGR system 1, and reliability of the low-pressure EGR system 1 can thereby be improved.

The failure detection means according to the second aspect detects conditions for air-intake into the engine 2 (e.g., actual intake flow rate, supercharging pressure, intake air temperature, actual EGR flow rate, and opening degree of the low-pressure EGR regulating valve 5) while the engine 2 is in operation. If a malfunction is detected or an occurrence of the malfunction is predicted from the detection result, the detection means carries out the failure determination. Accordingly, even when the engine 2 is in operation, the failure determination of the intake throttle valve 8 can be performed based on the intake conditions.

The low-pressure EGR system 1 according to the third aspect includes the throttle valve return spring 51 that urges the intake throttle valve 8 in its valve-opening direction. Accordingly, even if the intake throttle valve 8 becomes uncontrollable, the intake throttle valve 8 can be maintained in its valve-opening state by the operation of the throttle valve return spring 51, and a fail-safe can thereby be achieved.

The intake throttle valve 8 according to the fourth aspect employs a butterfly valve. In regard to this butterfly valve, an intake air contact area of the downstream valve plate 8a disposed on a downstream side of the rotatable shaft in the intake air flow direction is larger than an intake air contact area of the upstream valve plate 8b disposed on an upstream side of the rotatable shaft in the intake air flow direction. Accordingly, even if the intake throttle valve 8 becomes uncontrollable, the intake throttle valve 8 can be maintained in its valve-opening state by a flow of intake air flowing through the intake passage 3, and a fail-safe can thereby be achieved.

The mechanical stopper 10 according to the fifth aspect limits the fully-open side limit opening degree $\theta 3$ of the low-pressure EGR regulating valve 5 by an engagement position between the end portion of the cam groove 11 and the groove engaging body 12 (e.g., roller 12a and pin 12b). For this reason, despite prolonged use, deformation and damage of the end portion of the cam groove 11 and the groove engaging body 12 (e.g., roller 12a and pin 12b) which constitute the mechanical stopper 10 can be prevented.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A low-pressure exhaust gas recirculation (EGR) system for an engine having an intake passage which guides intake air into the engine, the system comprising:
    a low-pressure EGR passage that guides EGR gas into the intake passage;
    a low-pressure EGR regulating valve that is configured to regulate an opening degree of the low-pressure EGR passage;
    an electric actuator that is configured to drive the low-pressure EGR regulating valve;
    a low-pressure EGR opening sensor that is configured to detect an opening degree of the low-pressure EGR regulating valve;
    a control device that is configured to control energization of the electric actuator so as to control the opening degree of the low-pressure EGR regulating valve;
    an intake throttle valve that is configured to generate a negative pressure of intake air at a merging part of the intake passage and the low-pressure EGR passage;
    a linking device that is configured to change an output characteristic of the electric actuator so as to drive the intake throttle valve;
    a mechanical stopper that is provided for the linking device and is configured to limit a rotation range of the low-pressure EGR regulating valve at a limit opening degree of the low-pressure EGR regulating valve on its fully-open side and outside an EGR amount adjustment opening degree range of the low-pressure EGR regulating valve; and
    a failure detection unit that is provided for the control device, wherein after the engine is stopped, the failure detection unit rotates the low-pressure EGR regulating valve to its fully-open position to such an extent that rotation of the linking device is prevented by the mechanical stopper, and is configured to determine that a failure has occurred when the opening degree of the low-pressure EGR regulating valve detected by the low-pressure EGR opening sensor is different from the limit opening degree of the low-pressure EGR regulating valve.

2. The low-pressure EGR system according to claim 1, wherein:
   the failure detection unit is configured to detect a state of intake air guided into the engine while the engine is in operation; and
   the failure detection unit makes the failure determination based on the detected state of intake air.

3. The low-pressure EGR system according to claim 1, further comprising a throttle valve return spring that urges the intake throttle valve (8) in its valve-opening direction.

4. The low-pressure EGR system according to claim 1, further comprising a rotatable shaft that supports the intake throttle valve, wherein:
   the intake throttle valve is a butterfly valve including:
      a downstream valve plate located on a downstream side of the rotatable shaft in a flow direction of intake air; and
      an upstream valve plate located on an upstream side of the rotatable shaft in the flow direction of intake air; and
   an intake-air contact area of the downstream valve plate is larger than an intake-air contact area of the upstream valve plate.

5. The low-pressure EGR system according to claim 1, wherein:
   the linking device includes a female-side member having a cam groove, and a male-side member having a groove engaging body which is engaged with the cam groove; and
   an end portion of the cam groove and the groove engaging body constitute the mechanical stopper.

\* \* \* \* \*